Patented July 18, 1933

1,919,055

UNITED STATES PATENT OFFICE

EUGENE H. EISING, OF NEW YORK, N. Y.

THERAPEUTIC AGENT

No Drawing. Application filed September 13, 1932, Serial No. 632,950, and in Canada February 12, 1932.

(Continuation in part of applications Serial No. 496,042, filed November 15, 1930, and Serial No. 515,705, filed February 14, 1931.)

This invention relates to therapeutic agents, and includes among its objects the provision of (a) therapeutic agents characterized by a high degree of activity in promoting the healing of damaged and/or infected tissue, (b) a method whereby such therapeutic agents may be prepared from certain inert substances, and (c) a method of promoting the healing of damaged and/or infected tissue.

In the practice of this invention, unrefined petroleum products—especially petrolatum and liquid petrolatum—are therapeutically activated by exposure to ultra-violet irradiation. As employed herein, "unrefined petroleum products" means petroleum products containing one or more natural "impurities", i. e., substances other than hydrocarbons; and "petrolatum" and "liquid petrolatum" mean petrolatum and liquid petrolatum, respectively, unrefined in the same sense. It is to the presence of these "impurities" (the chemical identity of which has not yet been determined) that the unrefined petroleum products owe their activability. Since it generally accompanies such "impurities", fluorescence of the unirradiated petroleum products may ordinarily be regarded as an index of activability.

At first, activity increases more or less directly as the amount of irradiation, but after a while a maximum is reached and further irradiation causes a gradual diminution and then a complete loss of activity; and ultimately the product becomes a tissue irritant if irradiation is protracted until it would be sufficient—in duration and intensity—to bring about the defluorescence of fluorescent petroleum oils. Irradiation must therefore be discontinued short of the final stage mentioned.

Though fluorescence has occurred repeatedly in association with the property of activability in unirradiated petroleum products and of activity in irradiated petroleum products, there is no evidence that this correlation or concomitance is a necessary condition; on the contrary, it is believed that the fluorescence on the one hand, and the activability and activity on the other, are mutually independent and disassociable phenomena, so that it may be possible to eliminate the fluorescence without qualitatively or quantitatively affecting either the activability or the activity. In short, the exhibition of fluorescence may be considered a convenient or temporary, but not an absolute or permanent, criterion.

By such irradiation, unrefined petroleum products are transformed into therapeutic agents capable, on being applied to the affected parts, of exercising a remarkable bactericidal and curative action.

Thus, petrolatum—hitherto known in medicine only as a demulcent and air-excluding substance and merely used as a bland protective dressing and as a substitute for fats in ointments—is without appreciable beneficial effect on chronic sores and the like; but irradiation in accordance with this invention endows it with the extraordinary potentialities referred to, whereby it destroys pathogenic micro-organisms and accelerates cell proliferation, granulation, and other normal processes, making possible the rapid cure of sluggish wounds, ulcers, and other traumata, notably those of a bacterial character.

For the purposes of the invention, the most effective portion of the ultra-violet zone is that of the wave-lengths ranging between 2950 and 3800 Ångström units, the greatest intensity being found in the "cyanogen band", centering about the 3660-A. u. line. Any of the common ultra-violet-irradiation means may be employed, as quartz mercury-vapor, or preferably, carbon-arc, lamps.

As an example, a ⅜-inch layer of petrolatum in an open dish about 20 inches from an enclosed carbon arc, acquires the maximum therapeutic potency on irradiation for between 40 and 60 minutes. An additional hour or so of irradiation gives rise to a perceptible decrease in healing efficacy; if irradiation is continued for about six hours more, there is a total destruction of activity; and on prolonging the period of irradiation to about fifteen hours (sufficient to bring about defluorescence) the therapeutic properties are replaced by irritant qualities. In each instance the optimal period of irradiation will of course depend on such factors as the nature of the particular petroleum product treated, the kind and degree of radiant energy employed, and the distance of the product from the energy source.

Therapeutic agents prepared in accordance with this invention render an infected wound sterile after a few applications, and thereafter keep it so. They rapidly diminish the bacterial count in the exudate, causing a cessation of the purulent exudate and disappearance of the greenish-gray sloughs after two or three applications, which transformation under other treatment would take five to six weeks and, in the case of abdominal wounds, would leave the patient with a weak abdominal wall. Healthy granulation and complete closing of the wound result in a much shorter time. The utility of these therapeutic agents has been demonstrated in such diverse conditions as suppurations of the cellular tissues, joint cavities, infected post-operative surgical wounds, sinuses following gall-bladder operations, drainage in appendicial abscesses, fistulæ in ano, affections of the respiratory tract, infectious inflammations of the mucous membranes, empyema sinuses, infectious and mycotic cutaneous disorders, chronic bone sinuses following osteomyelitis, and varicose, diabetic, and decubital ulcers. Treatment may be achieved in any of numerous modes: for instance, as in the case of surgical wounds, by flooding the affected area with activated petrolatum liquefied by warming; or by directly filling the post-operative nasal sinuses with liquefied activated petrolatum, or, as in bronchiectasis, introducing it, by means of bronchoscope, directly into lung abscesses.

More specifically, in extensive suppurations of the abdominal wall following laparotomy, the entire wound is flooded with liquefied activated petrolatum, and covered with gauze; and a like application is made on the next day or after a two-day interval. Within twenty-four hours the discharge is greatly diminished; and after the second or third application the wound is free from purulent exudate, and sloughing fasciæ and necrosed fat have disappeared and granulation has begun. After two or three, or occasionally four, applications, the wound is sufficiently clean and free from discharge to allow of closure with deep silk-worm sutures.

Again, in teno-vaginitis, flooding the open tendon-sheath at the time of the operation with liquefied activated petrolatum, is signally successful. No extension of the infection occurs, as otherwise so frequently happens in these cases; purulent exudate is not seen at the next dressing; and the temperature drops to normal and healing rapidly follows.

Further, in sinuses and fistulous tracts such as persist after appendectomy and cholecystectomy, healing often occurs within two days after the first injection.

Still further, in chronic osteomyelitis, after thorough saucerization the bony trough is flooded with liquefied activated petrolatum and a dry dressing applied. Repetition of this treatment cures many otherwise intractable cases.

Experimentation has demonstrated that the curature powers conferred by the method of this invention are unrelated to vitamin D, photosynthesized in ergosterol-containing materials: on the one hand, activated petrolatum exercises no antirachitic effect on rats; and on the other neither viosterol nor viosterol mixed with unactivated petrolatum, when applied to wounds in the same manner as activated petrolatum, displays any of the latter's characteristic healing efficacy.

By adding an unrefined petroleum product to a refined petroleum product (such as "white mineral oil") and irradiating, it is possible to obtain a therapeutically activated mixture.

It is to be understood that the foregoing examples are merely illustrative and by no means limitative of the invention, which may be variously otherwise embodied—as with respect to the specific petroleum products activated, the apparatus for and manner of accomplishing irradiation, and the way of administering the therapeutic agents—within the scope of the appended claims.

I claim:

1. A therapeutic agent comprising an unrefined petroleum product exposed to ultra-violet irradiation less than would be sufficient to bring about the defluorescence of fluorescent petroleum oils.

2. A therapeutic agent comprising a fluorescent petroleum product ultra-violet-irradiated short of defluorescence.

3. A therapeutic agent comprising petrolatum exposed to ultra-violet irradiation less than would be sufficient to bring about the defluorescence of fluorescent petroleum oils.

4. A therapeutic agent comprising liquid petrolatum exposed to ultra-violet irradiation less than would be sufficient to bring about the defluorescence of fluorescent petroleum oils.

5. A therapeutic agent comprising petrolatum exposed, for a duration and at an intensity that would be insufficient to bring about the defluorescence of fluorescent petroleum oils, to ultra-violet rays having a wavelength of between 2950 and 3800 A. u.

6. The method of preparing a therapeutic agent that comprises exposing an unrefined petroleum product to ultra-violet irradiation less than would be sufficient to bring about the defluorescence of fluorescent petroleum oils.

7. The method of preparing a therapeutic agent that comprises ultra-violet irradiating, short of defluorescence, a fluorescent petroleum product.

8. The method of preparing a therapeutic agent that comprises exposing petrolatum to ultra-violet irradiation less than would be sufficient to bring about the defluorescence of fluorescent petroleum oils.

9. The method of preparing a therapeutic agent that comprises exposing liquid petrolatum to ultra-violet irradiation less than would be sufficient to bring about the defluorescence of fluorescent petroleum oils.

10. The method of preparing a therapeutic agent that comprises exposing petrolatum, for a duration and at an intensity that would be insufficient to bring about the defluorescence of fluorescent petroleum oils, to ultra-violet rays having a wave-length of between 2950 and 3800 A. u.

11. The process that comprises exposing an unrefined petroleum product to ultra-violet irradiation until said product has acquired the property of promoting the healing of damaged and/or infected tissue, such irradiation not being prolonged sufficiently to destroy said property.

12. A therapeutic agent comprising an unrefined petroleum product which has been exposed to ultra-violet irradiation until said petroleum product has acquired the property of promoting the healing of damaged and/or infected tissue, such irradiation not having been prolonged sufficiently to destroy said property.

EUGENE H. EISING.